United States Patent [19]
Sorenson

[11] 4,202,562
[45] May 13, 1980

[54] TRAILER HITCH

[76] Inventor: Conrad L. Sorenson, 1232 N. Euclid Ave., Upland, Calif. 91786

[21] Appl. No.: 905,847

[22] Filed: May 15, 1978

[51] Int. Cl.² ............................................. B60D 1/00
[52] U.S. Cl. ................................ 280/415 R; 280/482
[58] Field of Search ................ 280/406 A, 482, 501, 280/491 A, 491 R, 500, 496, 495, 415 R, 415 A

[56] References Cited

U.S. PATENT DOCUMENTS

| 2,176,878 | 10/1939 | Arehart | 280/495 X |
| 2,320,046 | 5/1943 | Notar | 280/482 X |
| 3,428,336 | 2/1969 | Thurman | 280/491 A |
| 3,730,556 | 5/1973 | Aldape | 280/482 X |

Primary Examiner—John A. Pekar
Attorney, Agent, or Firm—Boniard I. Brown

[57] ABSTRACT

An auxiliary towing hitch assembly and hitch extension for attaching a trailer to a towing vehicle such as a pickup truck, having a conventional towing hitch and mounting a body, such as a long camper body, which overhangs the rear end of the towing vehicle a distance such as to preclude direct attachment of the trailer to the vehicle hitch. The hitch assembly comprises a hitch extension in the form of a tow bar having front coupling means for releasable attachment to the towing vehicle hitch and rear coupling means for attachment to the trailer hitch. This hitch extension is removable to permit direct attachment of the trailer to the vehicle hitch when the overhanging vehicle body is removed.

16 Claims, 4 Drawing Figures

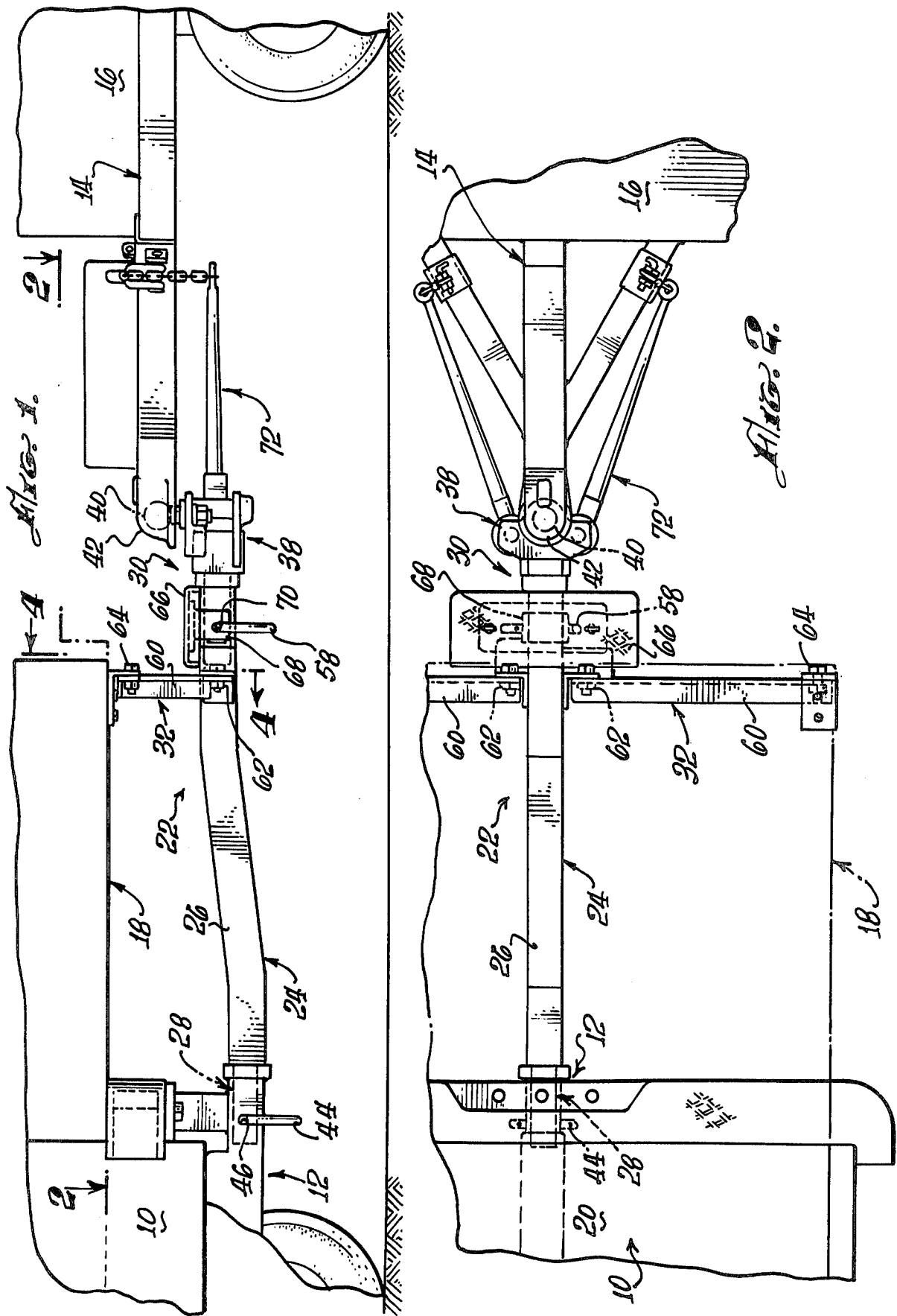

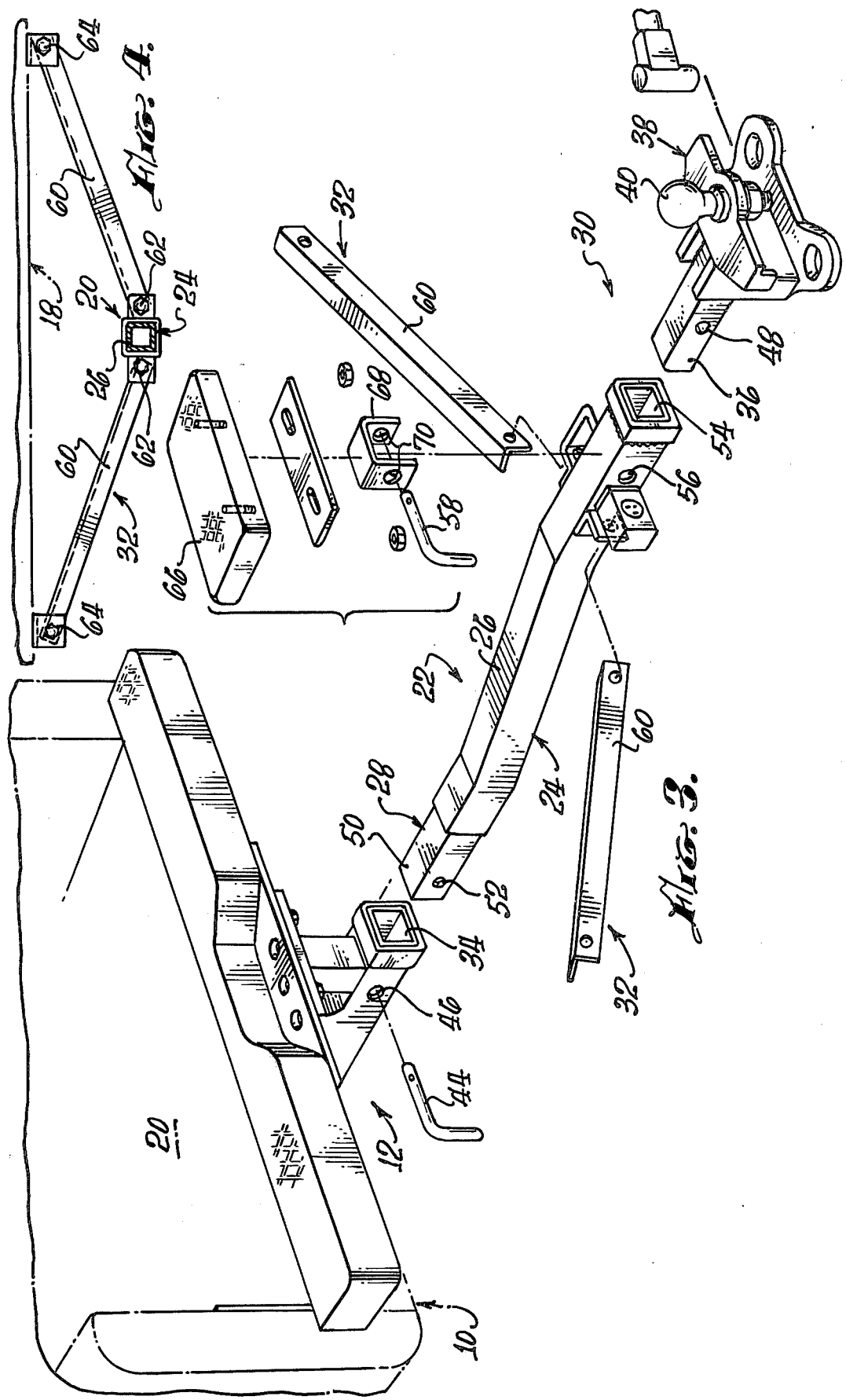

TRAILER HITCH

BACKGROUND OF THE INVENTION

1. Field of the Invention:

This invention relates generally to the trailer towing art and more particularly to a novel auxiliary towing hitch assembly and hitch extension therefore for attaching a trailer to a towing vehicle mounting a removable body vehicle overhangs the rear of the vehicle in a manner precluding direct attachment of the trailer to a conventional towing hitch on the vehicle.

2. Discussion of the Prior Art:

One popular type of trailer towing vehicle is a pickup truck which may also carry a removable camper body. The pickup truck mounts a rear towing hitch for attachment to the front towing hitch of a trailer. The coupling means of these hitches comprise a coupling ball on the vehicle hitch and a coupling socket on the trailer hitch for receiving the ball to form a swivel connection between the vehicle and trailer.

A typical towing vehicle hitch for this purpose comprises a tubular hitch member rigidly secured to the underside of the vehicle frame adjacent to its rear end and leaving a rearwardly opening socket. This socket receives a tongue on a removable coupling element which is releasably secured in the socket by a cross pin or the like extending through aligned holes in the socket wall and tongue. On the rear end of this coupling element is an upstanding coupling ball for engagement in the coupling socket of the trailer hitch.

If a long camper body is mounted on a pickup truck equipped with such a towing hitch, the camper body may overhang the rear end of the truck bed a sufficient distance to preclude direct attachment of a trailer hitch to the truck hitch. In the past, this has meant that a trailer could not be towed when carrying a camper body.

The prior art is replete with a vast assortment of towing hitches. Examples of these hitches are found in the following patents: U.S. Pat. Nos. 2,099,549; 2,320,046; 2,635,891; and 2,743,118. None of these listed patents or other patents of which I am aware, however, are directed toward or provide a solution for the problem stated.

SUMMARY OF THE INVENTION

This invention provides a novel auxiliary towing hitch and hitch extension which avoid the problem discussed above. In the particular pickup truck and camper example cited, for instance, the invention permits a trailer to be towed by a pickup truck even when carrying a camper which overhangs the rear of the truck sufficiently to preclude direct attachment of the trailer to a conventional towing hitch on the truck. On the other hand, this conventional hitch may be used when the camper is removed.

To these ends, the invention provides a towing hitch assembly including a hitch extension in the form of a tow bar. On the front end of this tow bar are coupling means for releasable coupling engagement with the conventional towing hitch on the towing vehicle. On the rear of the tow bar are coupling means for releasable coupling engagement with the towing hitch of the trailer to be towed. This tow bar is longitudinally sized to extend rearwardly from the towing vehicle hitch, under the rear overhang of the camper body or other removables body on the towing vehicle, to a point which is accessible for coupling engagement of the rear tow bar coupling means with the trailer towing hitch. The rear end of the tow bar may be releasably attached to the body for vertical and lateral support. The tow bar is removable from the towing vehicle to permit direct attachment of the trailer to the conventional towing hitch on the vehicle when the overhanging body is removed.

In the presently preferred inventive embodiment described, the conventional towing hitch on the towing vehicle comprises a tubular hitch member rigidly secured to the underside of and extending longitudinally of the towing vehicle. This member has a rearwardly opening socket removably receiving a tongue on a removable coupling element. The coupling element is removably secured to the vehicle hitch member, as by a cross pin extending through the socket wall and tongue, and has a rear upstanding coupling ball for engagement in a socket of a conventional trailer hitch.

This preferred inventive embodiment is designed for use when the coupling element of the conventional hitch on the towing vehicle is removed from its hitch socket. The front coupling means on the auxiliary hitch extension or tow bar comprises a tongue sized for insertion into this hitch socket and adapted for securement in the socket in any convenient way which is preferably the same as that used to secure the conventional coupling element in the socket. The rear coupling means on the tow bar includes a rearwardly opening socket which is sized to receive the tongue on the coupling element and adapted for attachment to the element.

In use of this preferred embodiment of the invention, the coupling element of the conventional towing hitch on the towing vehicle is removed and secured to the rear end of the auxiliary hitch tow bar. The tongue on the front end of the tow bar is secured in the socket of the conventional vehicle hitch. The rear end of the tow bar is attached for vertical and lateral support to the rear overhanging end of the removable body on the towing vehicle. The trailer to be towed is then attached to the rear coupling element on the tow bar. When the overhanging body is removed from the towing vehicle, the coupling element may be removed from the tow bar and reassembled on the towing vehicle hitch to permit direct attachment of this hitch to a trailer.

BRIEF DESCRIPTION OF THE DRAWINGS

FIG. 1 is a fragmentary side elevation of a towing vehicle, in this case a pickup truck mounting a camper body, and a trailer coupled to one another by an auxiliary towing hitch according to the invention;

FIG. 2 is a view taken on line 2—2 in FIG. 1;

FIG. 3 is an exploded perspective view of the towing vehicle and auxiliary hitch assembly; and FIG. 4 is a section taken on line 4—4 in FIG. 1.

DESCRIPTION OF THE PREFERRED EMBODIMENT

Referring to these drawings, reference numeral 10 denotes a towing vehicle equipped with a conventional towing hitch 12 for attachment to a hitch 14 on a trailer 16 to be towed. Vehicle 10 mounts a removable body 18. In this particular case the towing vehicle is a pickup truck having a rear truck bed 20. The removable body is a camper body which is supported on the bed. This invention is concerned with a towing vehicle and body combination in which the removable body 18 overhangs the rear of the truck bed 20 sufficiently to preclude direct attachment of the trailer hitch 14 to the vehicle hitch 12. In the drawings, for example, this overhang results from the relatively long length of the camper body compared to that of the truck bed 20.

The invention provides an auxiliary towing hitch 22 for connecting the trailer 16 to the towing vehicle or pickup truck 10 when the latter mounts the camper body 18. Generally speaking this auxiliary hitch comprises a hitch extension 24 including a tow bar 26. The particular tow bar shown is tubular in cross-section although it could be square in cross-section or have any other suitable construction. At the front end of this tow bar are front coupling means 28 for releasable connection to the towing vehicle hitch 12. At the rear end of the tow bar are rear coupling means 30 for releasable connection to the trailer hitch 14. Connecting means 32 are provided for vertically and laterally supporting the rear end of the tow bar.

When installed on the towing vehicle or truck 10, the front end of the tow bar 26 is connected by coupling means 28 to the vehicle hitch 12. The tow bar extends rearwardly along the underside of the rear overhanging portion of the camper body 18. The tow bar supporting means 32 are connected to the camper to support the rear tow bar end laterally and vertically. The rear tow bar coupling means 30 is engaged with the trailer hitch 14 to connect the trailer 16 to the truck 10.

Referring in more detail to the drawings, the conventional towing hitch 12 on the pickup truck 10 comprises a hitch member 32 rigidly joined to the underside of the truck chassis, at the rear end of the truck bed 20. Opening through the rear end of this hitch member is a coupling socket 34. In the conventional hitch, this socket receives a mating tongue 36 (FIG. 3) on a removable coupling element 38. This coupling element includes an upstanding coupling ball 40 secured to the rear end of the tongue 36 for coupling engagement in a coupling socket 42 on the trailer hitch 14 to form a conventional ball and socket towing hitch swivel coupling between the truck 10 and trailer 14. The coupling element 38 is adapted to be removably secured to the truck hitch member 32 by a cross pin 44 extending through aligned holes 46 in the wall of the hitch socket 34 and 48 in the coupling tongue 36.

In normal use of the pickup truck hitch 12 to tow the trailer 14, the coupling element 38 is assembled on the truck hitch member 32. The trailer hitch 14 is engaged with the coupling element 38 with the coupling ball 40 on this element engaging in the trailer hitch socket 42. It is evident from FIG. 3, however, that the conventional hitch 12 cannot be thus connected directly to the trailer hitch 14 when the camper body 18 is mounted on the truck 10 because of the rear overhang of the camper. The present auxiliary hitch 22 is used in this case by removing the coupling element 38 from the hitch socket member 32.

As noted earlier, the tow bar 26 of the auxiliary hitch extension 24 is essentially a tube. The bar may be stepped slightly, as shown, if necessary to locate the rear end of the bar at the proper elevation for connection to the trailer 16. The front coupling means 28 of the tow bar comprises a coupling tongue 50 which is sized for insertion into the truck hitch coupling socket 34 when the coupling element 38 is removed from the socket. This tongue has holes 52 which align with the truck hitch socket holes 46 when the tongue is fully inserted into the socket to permit releasable connection of the tow bar to the truck hitch 12 by means of the cross pin 44.

The coupling element 38 of the truck hitch 12, when removed from its hitch socket 34 to permit use of the auxiliary towing hitch 22, is utilized as part of the front tow bar coupling means 30. To this end, the front coupling means 30 comprises, in addition to the coupling element 38, a coupling socket 54 for receiving the tongue 36 of the coupling element. The wall of socket 54 has holes 56 which align with the coupling element tongue holes 48 when the coupling element is assembled on the tow bar 26 to receive a lock pin 58 for securing the element to the tow bar.

The tow bar supporting means 32 comprise two support bars or struts 60 which are pivotally attached at one end by bolts 62 to and extend laterally from the rear end of the tow bar 26. The outer ends of these struts are releasably attached at 64 to the underside of the camper body 18 to support the rear end of the tow bar vertically and laterally from the camper body.

If desired a removable step 66 may be provided on the auxiliary hitch 22. The step shown has a bottom yoke-shaped bracket 68 which straddles the rear end of the tow bar 26 and has holes 70 for receiving the rear coupling lock pin 58, whereby the latter secures both the step 66 and the coupling element 38 to the tow bar.

It is now evident that when the camper 18 is not mounted on the truck 10, the trailer hitch 14 may be coupled directly to the conventional truck hitch 12 by installing the coupling element 38 in the truck hitch socket 34. When the camper is mounted on the truck, the coupling element 38 is removed from the truck hitch socket 34 and the front coupling tongue 28 of the auxiliary hitch tow bar 26 is secured in the latter socket. The coupling element 38 is secured to the rear end of the tow bar and this tow bar end is supported on the coupler 18 by means of the struts 60. The trailer hitch 14 is then engaged with the coupling ball 40 of the coupling eelement. If desired, the trailer hitch may include a conventional load equalizer 72 which is connected between the coupling element and trailer hitch in the usual manner shown.

The inventor claims:

1. An auxiliary towing hitch extension for attaching a trailer having a front towing hitch to a towing vehicle having a rear towing hitch and a removable body which overhangs the rear end of said vehicle a substantial distance, comprising:

said vehicle hitch having a rearwardly opening coupling socket and said trailer hitch having a downwardly opening coupling socket for a coupling ball, a removable tow bar having normally front and rear ends, front coupling means at the front end of said tow bar for releasable coupling engagement with said vehicle hitch, said front tow bar coupling means comprising a longitudinally extending coupling tongue at the front end of said tow bar for insertion into said vehicle coupling socket, and means for releasably securing said tongue in the latter socket, and rear coupling means at the rear end of said tow bar for releasable coupling engagement with said trailer hitch, said rear tow bar coupling means comprising a rearwardly opening longitudinal coupling socket at the rear end of said tow bar, a coupling element including a coupling tongue removably engaged within said tow bar coupling socket and adapted for engagement in said vehicle coupling socket when said tow bar is not used and an upstanding coupling ball at the rear end of said coupling element tongue for removable engagement in said trailer coupling socket, and means for releasably securing said coupling element to said tow bar.

2. The towing hitch extension of claim 1, wherein:

said means for securing said coupling element to said tow bar comprises aligned holes in said coupling element tongue and the wall of said rear tow bar socket, and a removable lock pin extending through said aligned holes.

3. The towing hitch extension of claim 2, including:

a step having a bottom bracket with flanges straddling the rear end of said tow bar and having holes in said flanges through which said lock pin extends to releasably secure said step to said tow bar.

4. An auxiliary towing hitch extension for attaching a trailer having a front towing hitch to a towing vehicle having a rear towing hitch and a removable body which overhangs the rear end of said vehicle a substantial distance, comprising:

said vehicle hitch has a rearwardly opening coupling socket and said trailer hitch has a downwardly opening coupling socket for a coupling ball, a removable tow bar having normally front and rear ends, means for releasably securing the rear end of said tow bar to said towing vehicle body in lateral and vertical supporting relation to said vehicle body, front coupling means at the front end of said tow bar for releasable coupling engagement with said vehicle hitch, and said front tow bar coupling means comprises a longitudinally extending coupling tongue at the front end of said tow bar for insertion into said vehicle coupling socket, and means for releasably securing said tongue in the latter socket, said rear tow bar coupling means comprises a rearwardly opening longitudinally coupling socket at the rear end of said tow bar, a coupling element including a coupling tongue removably engaged within said tow bar coupling socket and adapted for engagement in said vehicle coupling socket when said tow bar is not used and an upstanding coupling ball at the rear end of said coupling element tongue for removable engagement in said trailer coupling socket, and means for releasably securing said coupling element to said tow bar.

5. The towing hitch extension of claim 9, wherein:

said means for securing said coupling element to said tow bar comprises aligned holes in said coupling element tongue and the wall of said rear tow bar socket, and a removable lock pin extending through said aligned holes.

6. In combination:

a vehicle for towing a trailer having a front towing hitch, a rear towing hitch on said vehicle, said vehicle hitch having a rearwardly opening coupling socket and said trailer hitch having a downwardly opening coupling socket for a coupling ball, a tow bar having front and rear ends, front coupling means at the front end of said tow bar releasably coupled to said vehicle hitch, said front tow bar coupling means comprising a longitudinally extending coupling tongue at the front end of said tow bar for insertion into said vehicle coupling socket, and means for releasably securing said tongue in the latter socket, and rear coupling means at the rear end of said tow bar for releasable coupling engagement with said trailer hitch, said rear tow bar coupling means comprising a rearwardly opening longitudinal coupling socket at the rear end of said tow bar, a coupling element including a coupling tongue removably engaged within said tow bar coupling socket and adapted for engagement in said vehicle coupling socket when said tow bar is not used and an upstanding coupling ball at the rear end of said coupling element tongue for removable engagement in said trailer coupling socket, and means for releasably securing said coupling element to said tow bar.

7. The combination of claim 6, wherein:

said means for securing said coupling element to said tow bar comprises aligned holes in said coupling element tongue and the wall of said rear tow bar socket, and a removable lock pin extending through said aligned holes.

8. The combination of claim 6, including:

means releasably securing the front end of said tow bar to said towing vehicle body in lateral and vertical supporting relation to said vehicle body.

9. The combination of claim 8, wherein:

said lateral securing means comprise struts secured to and extending laterally and vertically between said tow bar and said vehicle body.

10. An auxiliary towing hitch extension for attaching a trailer having a front towing hitch to a towing vehicle having a rear towing hitch and a removable body which overhangs the rear end of said vehicle a substantial distance, comprising:

a removable tow bar having normally front and rear end portions, and a coupling element releasably engageable with the vehicle hitch and with the rear end portion of the tow bar, the vehicle hitch and the rear end portion of the tow bar each being adapted for releasable coupling engagement with the coupling element, whereby the coupling element is removable from the tow bar and engageable on said vehicle hitch to form a part of the latter when said extension is removed from the vehicle.

11. An auxiliary towing hitch extension according to claim 10, wherein:

the coupling element, the vehicle hitch and tow bar rear end portion are adapted to engage in tongue-and-socket relation.

12. An auxiliary towing hitch extension according to claim 11, wherein:

said vehicle hitch and tow bar rear end portion have similar coupling sockets, and the coupling element has a tongue adapted for mating engagement with either of said coupling sockets.

13. An auxiliary towing hitch extension according to claim 10 or claim 11 or claim 12 and further including:

means for releasably securing the coupling element to the tow bar or to the vehicle hitch.

14. The towing hitch extension of claim 1 or claim 10 or claim 11, including:

means for releasably securing the front end of said tow bar to said towing vehicle body in lateral and vertical supporting relation to said vehicle body.

15. An auxiliary towing hitch extension according to claim 10 or claim 11, and further including:
an upstanding coupling ball at the rear end of a coupling element tongue for removable engagement in a trailer coupling socket.

16. The towing hitch extension of claim 6, or 10, wherein:
said latter securing means comprise struts secured to and extending laterally and upwardly from the rear end of said tow bar.

* * * * *